US010071809B2

(12) United States Patent
English et al.

(10) Patent No.: US 10,071,809 B2
(45) Date of Patent: Sep. 11, 2018

(54) SYSTEM AND METHOD FOR RESERVE PARACHUTE DEPLOYMENT

(71) Applicant: WE DESIGNS, LLC, Orange City, FL (US)

(72) Inventors: Dawn Michelle English, Islamorada, FL (US); William George Weber, Dunnellon, FL (US)

(73) Assignee: WE DESIGNS, LLC, Orange City, FL (US)

( * ) Notice: Subject to any disclaimer, the term of this patent is extended or adjusted under 35 U.S.C. 154(b) by 390 days.

(21) Appl. No.: 14/465,092

(22) Filed: Aug. 21, 2014

(65) Prior Publication Data
US 2015/0053822 A1 Feb. 26, 2015

Related U.S. Application Data

(60) Provisional application No. 61/868,096, filed on Aug. 21, 2013.

(51) Int. Cl.
*B64D 17/74* (2006.01)
*B64D 17/62* (2006.01)

(52) U.S. Cl.
CPC ............. *B64D 17/74* (2013.01); *B64D 17/62* (2013.01)

(58) Field of Classification Search
CPC .................................................. B64D 17/343
USPC ................................................ 244/147, 149
See application file for complete search history.

(56) References Cited

U.S. PATENT DOCUMENTS

| | | | | |
|---|---|---|---|---|
| 4,898,346 A | * | 2/1990 | Ertler ..................... | B64D 17/40 244/147 |
| 4,948,071 A | * | 8/1990 | Summers, III ......... | B64D 17/64 244/147 |
| 6,056,242 A | * | 5/2000 | Collins .................. | B64D 17/38 244/147 |
| 6,086,019 A | * | 7/2000 | Ciuffi .................... | B64D 17/62 244/149 |

(Continued)

FOREIGN PATENT DOCUMENTS

EP 0 251 926 1/1988

OTHER PUBLICATIONS

International Search Report, dated Dec. 31, 2014 .
International Search Report, dated Apr. 18, 2017.

*Primary Examiner* — Timothy D Collins
*Assistant Examiner* — Keith L Dixon
(74) *Attorney, Agent, or Firm* — Terry M. Sanks, Esq.; Cian G. O'Brien, Esq.; Beusse Wolter Sanks & Maire, PLLC (57) ABSTRACT

A trap system is presented for deployment of a reserve parachute. The trap system includes a trap line with a first end coupled to a main parachute and a trap attached to a surface of the container. The trap includes an outer perimeter to removably hold the trap line and an interior to removably hold the reserve bridle. A kit is also presented for converting a parachute container into an improved parachute container to deploy a reserve parachute. The kit includes an attachment to be secured to a surface of the parachute container. The attachment includes a trap line with a first end configured to be coupled to the first end of the RSL lanyard, and a trap secured to a region of the attachment, with an outer perimeter to removably hold a second end of the trap line and an interior to removably hold the reserve bridle.

16 Claims, 11 Drawing Sheets

(56) References Cited

U.S. PATENT DOCUMENTS

| | | | |
|---|---|---|---|
| 6,431,495 B1 * | 8/2002 | Lawyer | B64D 17/32 244/149 |
| 7,118,073 B2 | 10/2006 | Booth | |
| 7,837,152 B2 * | 11/2010 | Booth | B64D 17/52 244/149 |
| 8,074,934 B2 | 12/2011 | Fradet | |
| 2004/0155153 A1 | 8/2004 | Booth | |
| 2009/0127395 A1 | 5/2009 | Fradet | |
| 2012/0025028 A1 | 2/2012 | Suze | |

\* cited by examiner

SYSTEM AND METHOD FOR RESERVE PARACHUTE DEPLOYMENT

CROSS-REFERENCE TO RELATED APPLICATIONS

This application is a Non-Provisional Patent Application that claims the benefit to U.S. Provisional Patent Application No. 61/868,096 filed on Aug. 21, 2013, and incorporated by reference herein in its entirety.

FIELD

Disclosed embodiments relate to parachutes, and more particularly to a deployment system and method for a parachute deployment. The disclosed embodiments more particularly relate to a system and method for parachute deployment that minimizes the time and altitude loss required to deploy the reserve parachute.

BACKGROUND

Reserve parachutes have been used as a back-up parachute to an original main parachute. When reserve parachutes were initially used, however, they would routinely become entangled with a malfunctioned main parachute. A method was then developed so that the jumper could release (i.e. cut-away) the malfunctioned main parachute prior to deploying the reserve parachute. However, this introduced a new drawback of loss of time and altitude after cut-away of the main parachute for the reserve parachute to then fully deploy. To decrease the reserve deployment time/altitude requirements after cut-away of the main parachute, a Reserve Static Line (RSL) was introduced, with one end connected to the main parachute riser(s) and the other end attached to a reserve ripcord pin that deploys the reserve parachute. Upon cut-away of the main parachute, as the jumper falls away, the RSL is pulled taut and removes the reserve ripcord pin, causing the reserve pilot chute to be released and deploy the reserve parachute.

Although the RSL reduced the time and altitude to pull the reserve ripcord pin, it did not reduce the actual deployment time/attitude of the reserve parachute, once the reserve parachute container is opened.

BRIEF DESCRIPTION

One embodiment may include a trap system for deployment of a reserve parachute from a container. The reserve parachute may be secured within a free bag connected by a reserve bridle to a reserve pilot chute. The trap system may include a trap line with a first end coupled to a main parachute and a trap attached to a surface of the container. The trap may include an outer perimeter to removably hold a second end of the trap line and an interior within the outer perimeter to removably hold the reserve bridle.

Another embodiment may include a system for deployment of a reserve parachute secured within a free bag. The system may include a means for coupling the main parachute to the free bag to deploy the reserve parachute. The main parachute and the free bag may be initially decoupled prior to the deployment of the reserve parachute.

Another embodiment may include a kit for converting a parachute container into an improved parachute container configured to deploy a reserve parachute. The parachute container may include a reserve parachute secured within a free bag connected by a reserve bridle to a reserve pilot chute. The parachute container may further include an RSL lanyard with a first end attached to a reserve ripcord and a second end attached to main risers of the main parachute. The kit may include an attachment configured to be secured to a surface of the parachute container. The kit may include a trap line with a first end configured to be coupled to the first end of the RSL lanyard. The attachment may also include a trap configured to be attached to the surface of the parachute container. The trap may also include an outer perimeter to removably hold a second end of the trap line and an interior within the outer perimeter configured to removably hold the reserve bridle. Another embodiment may include a method for installing a trap to deploy a reserve parachute from a container. The reserve parachute may be secured within a free bag connected by a reserve bridle to a reserve pilot chute. The method may start by attaching a trap to a surface of the container and coupling a first end of a trap line to a main parachute. The method may further include removably holding a second end of the trap line with an outer perimeter of the trap and removably holding at least a portion of the free bag, the reserve bridle or the reserve pilot chute with the trap.

BRIEF DESCRIPTION OF THE DRAWINGS

The disclosed embodiments are explained in the following description in view of the drawings that show.

DETAILED DESCRIPTION

The inventors recognized that it would be advantageous to reduce the time and altitude required for reserve parachute deployment after cut-away from a malfunctioned main parachute. The inventors also recognized that while the reserve pilot chute is an effective anchor to deploy the reserve parachute, in many cases the malfunctioned main parachute is a much more effective anchor to deploy the reserve parachute, thereby reducing the time and altitude required for reserve parachute deployment. The inventors also recognized that although other systems have been developed to utilize the malfunctioned main parachute as a deployment anchor for the reserve parachute, these systems have several drawbacks. First, these systems initially connect the main parachute to the reserve parachute system, and thus presume that the main parachute will operate as the deployment anchor for the reserve parachute. Thus, if the main parachute should not operate as the deployment anchor, such as after a failed deployment of the main parachute or a low drag malfunction (i.e. a bag lock malfunction), these systems require intricate structural components which must disconnect the main parachute from the reserve parachute system, and thus introduce inherent failure risk. The inventors of the present invention recognized that, if the main parachute is instead initially decoupled from the reserve parachute system and is only subsequently coupled to the reserve parachute system once the main parachute will be used as the deployment anchor, the resulting system is structurally simpler and thus inherently more reliable than the current systems.

Figure 1A:
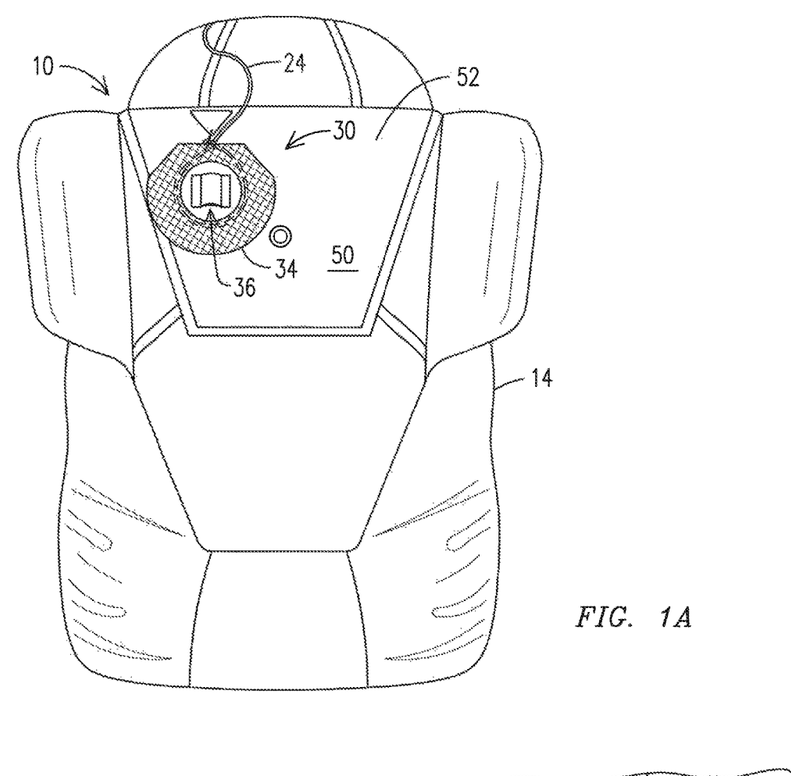
FIG. 1A is a plan view of a trap and a trap line of the system installed on a parachute container.
Figure 1B:
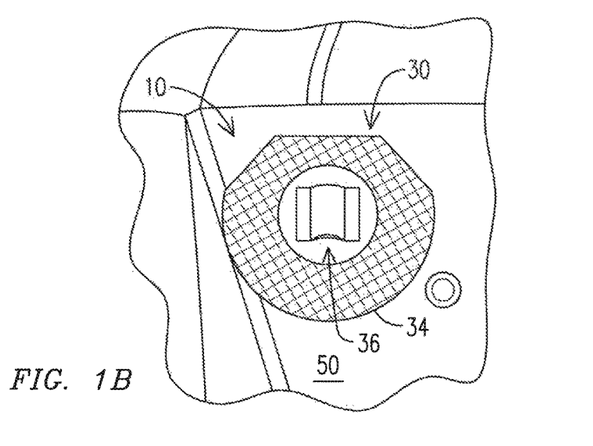
FIG. 1B is a partial view of the trap of the system of FIG. 1A.
Figure 2A:
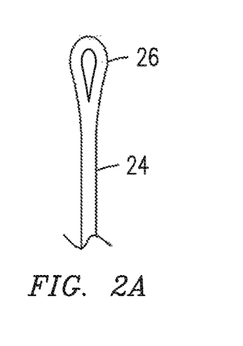
FIG. 2A is a plan view of a first end of the trap line of FIG. 1A.
Figure 2B:
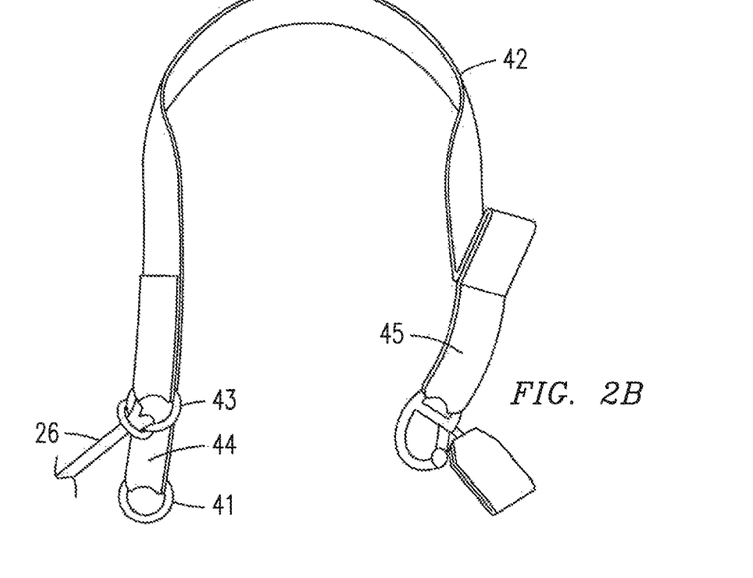
FIG. 2B is a plan view of the first end of the trap line of FIG. 2A connected to a first end of an RSL lanyard.
Figures 2C, 2D:
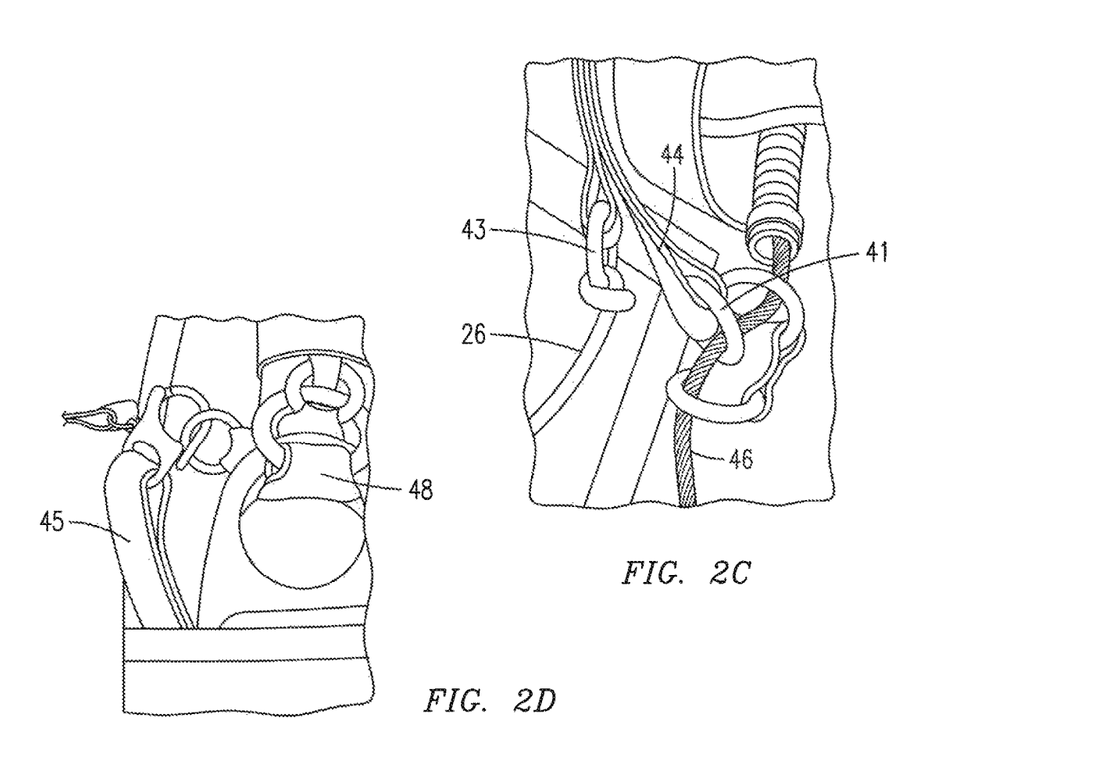
FIG. 2C is a plan view of the first end of the trap line and the first end of the RSL lanyard of FIG. 2B.
FIG. 2D is a plan view of a second end of the RSL lanyard of FIG. 2B connected to main risers of a main parachute.

FIGS. 1A-1B illustrate a trap system 10 that may include a trap 30 attached to a surface of a parachute container 14. In a non-limiting example, the trap 30 may be attached to a mid portion 52 of a kicker flap 50 of the parachute container 14. The trap 30 may include an outer perimeter 34 and an interior 36 within the outer perimeter 34. The trap 30 is discussed in greater detail below. In addition to the trap 30 of FIGS. 1A-1B, the system 10 may include a trap line 24 having a first end 26 illustrated in FIG. 2A with a loop. As further illustrated in FIG. 2B, the first end 26 of the trap line 24 may be connected to a metal ring 43 that is offset from a first end 44 of an RSL lanyard 42, by passing the trap line 24 through the loop in the first end 26 and through the metal ring 43 of the RSL lanyard 42. In a non-limiting example, the metal ring 43 is offset from the first end 44 by a distance in a range from 1-6", for example. In a non-limiting example, although FIG. 2B depicts the metal ring 43 connected to the trap line 24 on one side of the first end 44 and metal ring 41, the metal ring 43 may be connected to the trap line 74 on an opposite side of the first end 44 and metal ring 41, and may be offset from the opposite side of the first end 44 and metal 41 be a distance in a range of 1-6", for example. As further illustrated in FIG. 2C, the first end 26 of the trap line 24 is connected to and passes through the metal ring 43 offset from the first end 44 of the RSL lanyard 42, and the reserve ripcord 46 is connected to and passes through a metal ring 41 that is connected to the first end 44 of the RSL lanyard 42. Although FIGS. 2B-2C depict the RSL lanyard with two metal rings 41, 43 attached near the first end 44, the RSL lanyard may include the metal ring 41 (without the metal ring 43) attached to the end 44, where the reserve ripcord 46 is connected to and passes through the metal ring 41 and the first end 26 of the trap line 24 is connected to and passes through the metal ring 41. Additionally, as illustrated in FIG. 2D, a second end 45 of the RSL lanyard 42 may be connected to main risers 48 of the main parachute. As appreciated by one skilled in the art, upon cut-away of a main parachute, the RSL lanyard 42 is configured to pull the reserve ripcord 46 and deploy the reserve parachute. Thus, since the first end 26 of the trap line 24 is connected to the first end 44 of the RSL lanyard 42, the trap line 24 is also coupled to the risers 48 of the main parachute upon cut-away of the main parachute. The above-discussed embodiment discloses that the trap 30 may be attached to the mid portion 52 of the kicker flap 50, so that the mid portion 52 of the kicker flap 50 is adjacent to a portion of a cover flap where the first end 44 of the RSL lanyard 42 is looped over the reserve ripcord 46, consequently the length of the trap line 24 can be below a length threshold. However, the trap 30 need not be attached to any specific location on the kicker flap 50 or on the container 14, and may be attached to any location on the container 14, provided that the trap 30 has the characteristics disclosed in the embodiments.

Figures 3A, 3B, 3C:
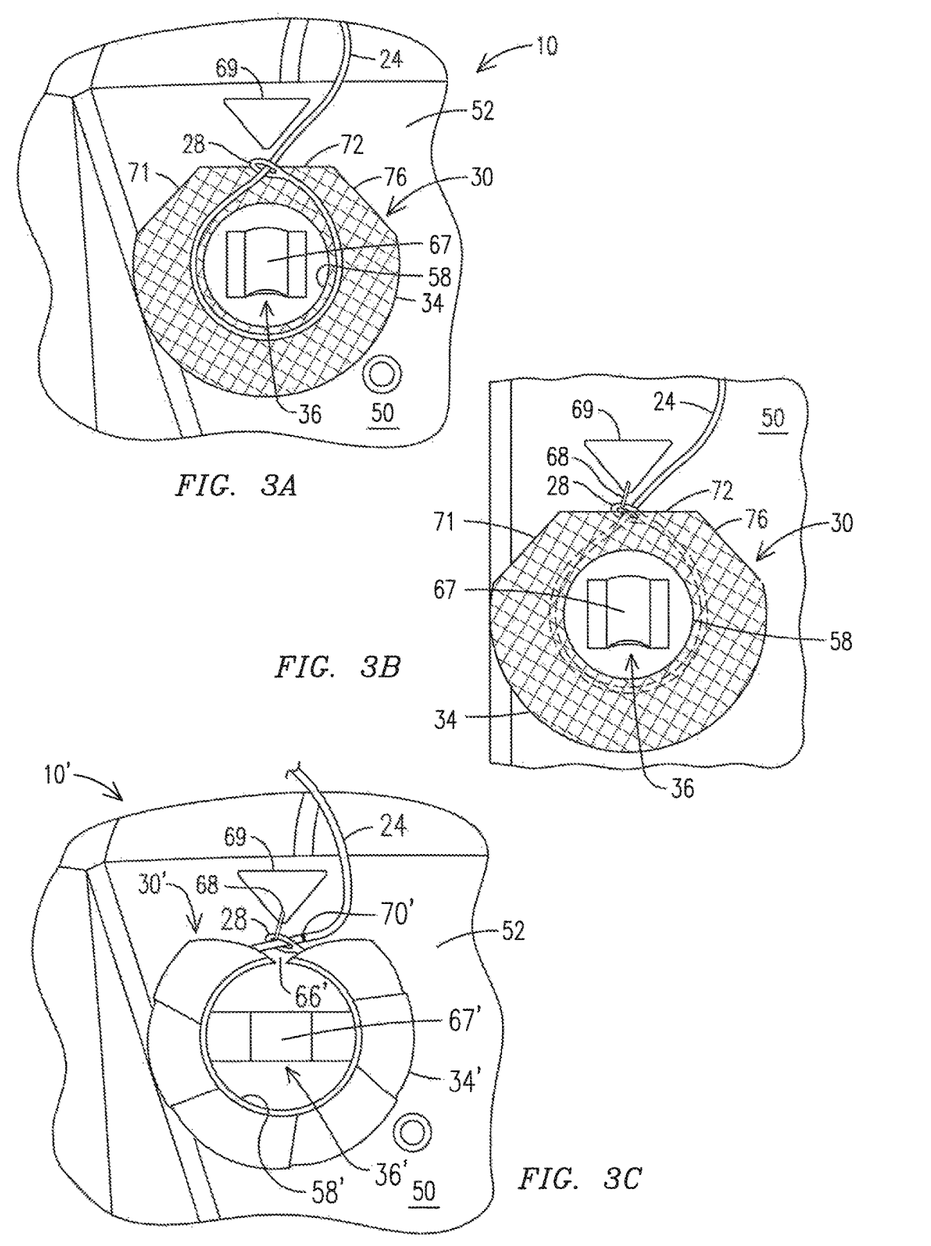
FIG. 3A is a plan view of the system of FIG. 1B with a second end of the trap line.
FIG. 3B is a plan view of the system of FIG. 3A with the second end of the trap line removably held under the trap and tacked to an anchor point.
FIG. 3C is a plan view of an alternate trap of a system configured to be installed on a parachute container.

As illustrated in FIGS. 3A-3B, the trap 30 may include the outer perimeter 34 to removably hold a second end 28 of the trap line 24. The outer perimeter 34 may be detached from the mid portion 52 of the kicker flap 50 to form an edge sized to removably hold the second end 28 of the trap line 24, or any part of the trap line 24. The trap 30 also includes an inner perimeter 58 attached to the mid portion 52 of the kicker flap 50. As illustrated in FIG. 3A, the outer perimeter 34 of the trap 30 may have an arcuate form, such as a circular form, including a flat side 72 and angled sides 71, 76 on either side of the flat side 72. In a non-limiting example, the flat side 72 may be cut inward at a ratio of approximately ⅛ of the diameter of the circular outer perimeter 34. In a non-limiting example, the angled sides 71, 76 may be cut at an angle of approximately 45 degrees to the flat side 72. In a non-limiting example, the outer diameter of the outer perimeter 34 may be approximately 4 inches, the inner diameter of the inner perimeter 58 is approximately 2 inches, the flat side 72 is cut inward approximately ⅛" and the angled sides are cut at approximately 45 degrees. Additionally, as illustrated in FIGS. 3A-3B, a cinch point or an anchor point 69 may be included that is attached to the mid portion 52 of the kicker flap 50 and is positioned at the circumference of the trap 30. A tack thread 68 may be passed through a loop hole of the second end 28 of the trap line 24 and is tacked to the anchor point 69, so that the loop of the second end 28 is anchored. This ensures that the loop of the second end 28 of the trap line 24 remains at the cinch point 69 in place for cinching in the vicinity of the flat side 72 of the outer perimeter 34. In a non-limiting example, the trap 30 and outer perimeter 34 may be made from a mesh material. However, the trap and the outer perimeter are not limited to any specific material, provided that the material chosen to be used is capable of accomplishing the above-discussed function of the trap.

As further illustrated in FIG. 3B, the second end 28 of the trap line 24 may have a loop through which the trap line 24 is passed so that the trap line 24 can be removably held under the edge of the outer perimeter 34.

FIG. 3C illustrates an alternate trap 30' that includes an outer perimeter 34' with ridges or folds along the circumference of the outer perimeter 34', where the ridges or folds increase the rigidity of the outer perimeter 34' and the edge of the outer perimeter 34'. In a non-limiting example, the increased rigidity of the outer perimeter 34' may removably hold the second end 28 of the trap line 24 behind the edge. However, the outer perimeter 34' need not include the ridges/folds, and may be made from a material which has an inherent rigidity/strength capable of removably holding the second end 28 behind the edge, without the ridges/folds. As further illustrated in FIG. 3C, a marking 70' may be placed on the trap line 24 that is passed through the loop of the second end 28 and is located outside the outer perimeter 34', where the marking 70' is used as a visual indicator that the tack thread 68 remains intact and the trap line 24 has not been pulled above the anchor point 69. Although FIG. 3C illustrates the marking 70' along the trap line 24, the trap does not need to include a marking along the trap line in order for the trap to function effectively and thus the trap may exclude the trap line marking.

Figure 3D:
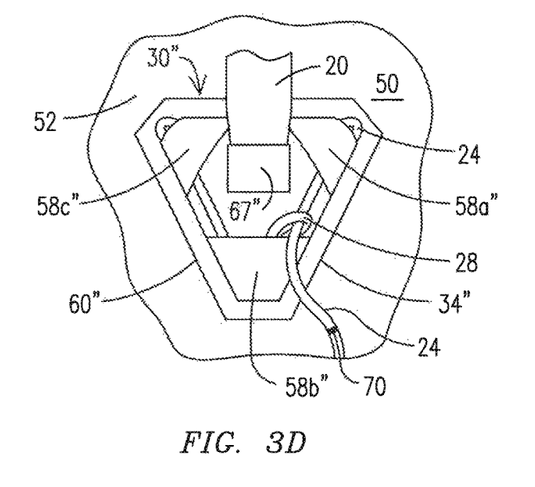
FIG. 3D is a plan view of an alternate trap of a system configured to be installed on a parachute container.

FIG. 3D illustrates an alternate trap 30" with an outer perimeter 34" that may be attached to the surface of the kicker flap 50 and the inner perimeter 58" is detached from the surface of the kicker flap 50 so that the edge is formed by the inner perimeter 58", to removably hold the second end 28 of the trap line 24. As illustrated in FIG. 3D, the trap 30" may be triangular shaped and the inner perimeter 58" includes material at each corner of the triangular-shaped trap 30", to form an edge at each corner to hold down the second end 28 of the trap line 24.

FIGS. 3A-3D illustrate that the traps 30, 30', 30" may form an arcuate shape such as a circular shape, or a polygon shape. In a non-limiting example, the trap may take a triangular shape. However, the disclosed embodiments are not limited to any specific arcuate or polygon shape and the outer perimeter and inner perimeter may take any shape such as any polygon shape, including a square or a rectangle, or any arcuate shape. In a non-limiting example, the outer perimeter and inner perimeter arcuate shape may be an oval shape. In a non-limiting example, the material used to make the outer perimeter 34 may be elastic material, binding tape, Tyvek®, Parapak®, mesh, metal, rubber, plastic, webbing, etc. In a non-limiting example, the material used to make the interior 36 may be elastic material, binding tape, Tyvek®, Parapak®, mesh, metal, rubber, plastic, webbing, etc. In a non-limiting example, the material used to make the trap line 24 may be 725-1000 spectra parachute line material. In a non-limiting example, the diameter of the inner perimeter 58 may be within a range of 1-3" and the diameter of the outer perimeter 34 may be within a range of 3-5". In a non-limiting example, the dimensions of the interior 36 may be within a range of 0.75-1.25". In a non-limiting example, the dimensions of the trap line 24 may have a length within a range of 12-18", with loops in the range of 0.5-1.0" at both ends 26, 28. In an embodiment, the dimensions of the outer perimeter, interior and trap line are determined, based on a size of the container on which the trap is installed. The materials and dimensions listed above are merely non-limiting examples and the disclosed embodiments are not limited to any specific dimension range or types of materials to be used to make the trap and the trap line, provided that the dimension and material used to form the trap and the trap line are effective to achieve the structural characteristics of the embodiments of the trap system disclosed herein. In a non-limiting example, the material used to form the trap should be chosen such that the material is sturdy and pliable enough to hold the trap line and permit the trap and trap line to operate in the manner discussed herein. Additionally, in a non-limiting example, the material used to form the trap line should be chosen such that the material provides similar grip and/or similar release resistance as a spectra parachute line material.

Figure 4A:
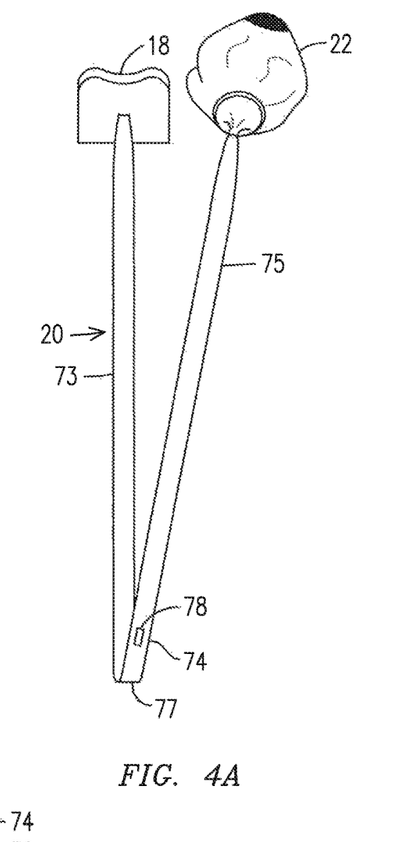
FIG. 4A is a plan view of a reserve free bag connected by a reserve bridle to a reserve pilot chute.
Figures 4B, 4C, 4D:
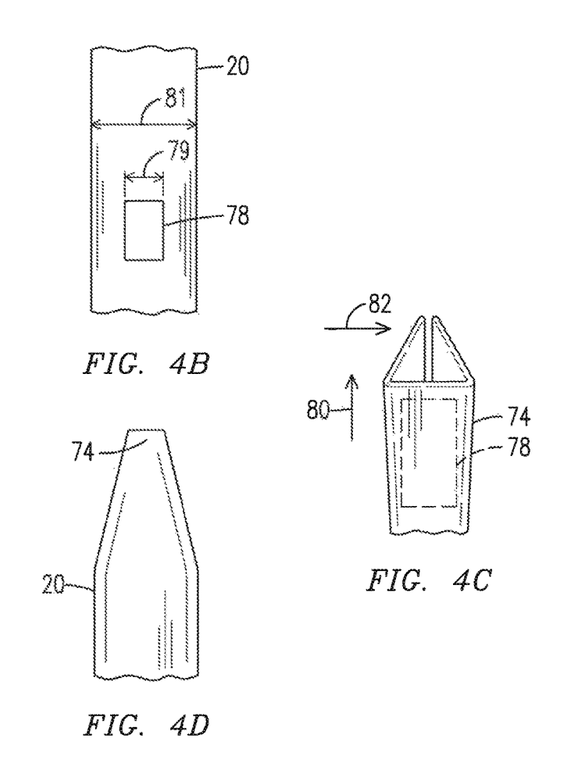
FIG. 4B is a plan view of an intermediate location along the reserve bridle of FIG. 4A.
FIG. 4C is a plan view of the reserve bridle folded at the intermediate location of FIG. 4B.
FIG. 4D is a plan view of the intermediate location along the reserve bridle of FIG. 4C.

FIG. 4A illustrates a free bag 18 within which the reserve parachute is contained, and the free bag 18 may be connected by a reserve bridle 20 to a reserve pilot chute 22. The reserve bridle 20 may include an intermediate location 74 positioned at a location between a midpoint 77 of the reserve bridle 20 and the pilot chute 22. The distance between the intermediate location 74 and the reserve pilot chute 22 is less than a length of the distance between the intermediate location 74 and the free bag 18. Although the distance between the intermediate location 74 and the pilot chute 22 is greater than a length of the trap line 24, it is primarily the speed differential between the main parachute and the pilot chute 22 which causes the main parachute to pull the trap line 24 taut and thus the main parachute to serve as the deployment anchor of the reserve parachute, if the main parachute is not entangled and breaks away. Additionally, the above distance relationship results in the main risers 48 having a shorter distance to travel to pull the trap line 24 taut than the deployment distance of the reserve pilot chute 22, which further contributes to the main parachute serving as the deployment anchor of the reserve parachute, if the main parachute is not entangled and breaks away. In a non-limiting example, the length between the intermediate location 74 and the midpoint 77 may be approximately 12". The intermediate location 74 separates the reserve bridle 20 into a first portion 73 of the bridle 20 between the intermediate location 74 and the free bag 18 and a second portion 75 of the bridle 20 between the intermediate location 74 and the reserve pilot chute 22. As further illustrated in FIG. 4A, the intermediate location 74 may include a portion of webbing 78 attached to the reserve bridle 20. In a non-limiting example, the webbing 78 may be sewn down to the reserve bridle 20 at the intermediate location 74, or any location along the reserve bridle 20 that is inserted within the loop 67. As illustrated in FIG. 4C, the reserve bridle 20 is folded at the intermediate location 74 along a length dimension 80 and along a width dimension 82 of the reserve bridle 20. In a non-limiting example, the reserve bridle 20 may have a width of approximately 2" and the reserve bridle 20 may be folded along the width dimension 82 such that the width of the reserve bridle 20 at the intermediate location 74 is approximately 1". However, the folding of the reserve bridle 20 is not limited by these above width ranges and the reserve bridle 20 may be sized and folded by any dimension, provided that the intermediate location 74 and reserve bridle 20 are effective to perform the functions disclosed in the embodiments. As further illustrated in FIGS. 4B and 4D, the webbing 78 may be attached to the reserve bridle 20, where the width 79 of the webbing 78 is approximately one-third the width 81 of the reserve bridle 20, such that the reserve bridle 20 on either side of the webbing 78 can be folded in the width dimension 82 over the webbing 78. The reserve bridle 20 may then be folded in the length dimension 80 at the intermediate location 74 (FIG. 4D) which can then be placed in the trap, as discussed below. In a non-limiting example, the webbing 78 may have a width of approximately 0.75" and a length of approximately 1.25". In a non-limiting example, the reserve bridle 20 may have a width of approximately 2" (unfolded) and in a range of approximately 0.5-1.0" (folded).

Figure 5:
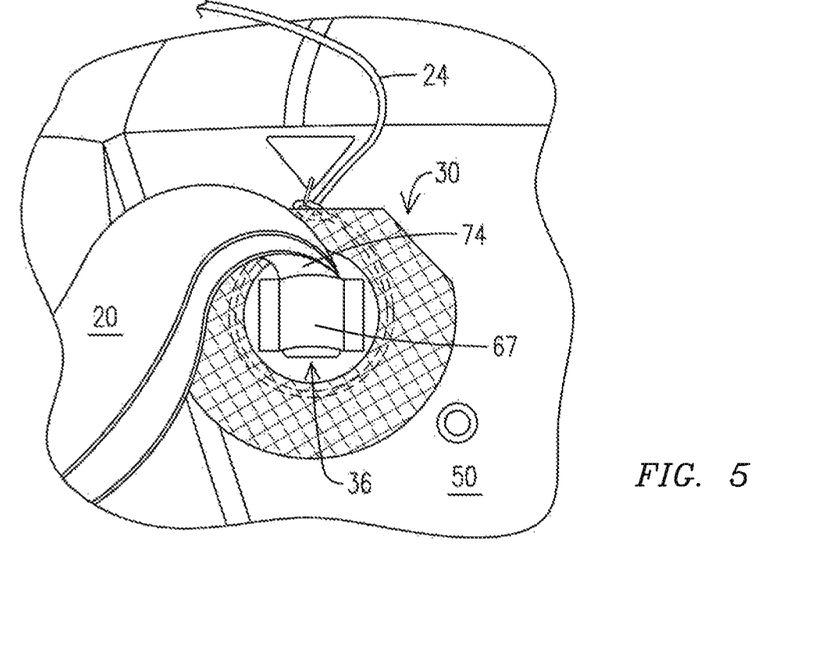
FIG. 5 is a plan view of the intermediate location of the reserve bridle removably held by the trap of the system of FIG. 3B.

FIG. 5 illustrates that the interior 36 of the trap 30 that is attached to the kicker flap 50. The trap 30 defines a loop 67 over a portion of the interior 36 that is not attached to the kicker flap 50. In an embodiment, the interior 36 may be made from an elastic material, such that the loop 67 provides an opening where the elastic material of the interior 36 compresses to hold an item inserted within the loop 67. As illustrated in FIG. 5, after folding the intermediate location 74 of the reserve bridle 20 (FIG. 4B), the intermediate location 74 of the reserve bridle 20 may be inserted within the loop 67 and removably held within the loop 67 of the interior 36. In a non-limiting example, any portion of the reserve bridle 20 may be inserted within the loop 67 and removably held within the loop 67 and thus the intermediate location 74 of the reserve bridle 20 need not be inserted within the loop 67. The webbing 78 of the bridle 20 and the folding of the intermediate location 74 may provide additional bulk and/or friction when the intermediate location 74 is inserted within the loop 67 of the interior 36. However, the webbing 78 and folding of the intermediate location 74 is not required and the intermediate location 74 may be simply inserted within the loop 67, without the need for the webbing and folding discussed above.

As illustrated in FIG. 3B, the trap 30 may define an anchor point 69 along the surface of the kicker flap 50, and the first end 26 of the trap line 24 is passed through the loop of the second end 28. The tack thread 68 is attached to the anchor point 69. The loop at the second end 28 is tacked to the anchor point 69 by passing the tack thread 68 through the loop of the second end 28, so as not to breach the integrity of the line or thread. Upon tension in the trap line 24, the trap line 24 is released from behind the edge and tightens around the reserve bridle 20. As illustrated in FIG. 3B, the anchor point 69 is positioned at an approximate 12 o'clock position, based on the frame of reference of FIG. 1A. As illustrated in FIG. 5, the intermediate location 74 of the reserve bridle 20 may be inserted within the loop 67 from a direction of the anchor point 69, to further position the loop of the second end 28 of the trap line 24 to tighten with the reserve bridle 20, upon tension in the trap line 24 and release of the trap line 24 from behind the edge of the outer perimeter 34. In a non-limiting example, the intermediate location 74 may be inserted within the loop 67 from any direction, relative to the anchor point 69. The tack thread 68 and anchor point 69 are configured to anchor the loop of the second end 28 and fix the loop as the cinch point near the anchor point 69. Although FIG. 5 depicts that the intermediate location 74 of the reserve bridle 20 is inserted within the loop 67, any portion of the reserve system including at least a portion of the free bag 18, or at least a portion of the reserve bridle 20 or at least a portion of the reserve pilot chute 22 may be inserted within the loop 67. Additionally, any line or extension connected to any portion of the reserve system may be inserted within the loop 67. Although FIG. 3B illustrates the tack thread 68, the trap does not need to include a tack thread in order for the trap to function effectively and thus the trap may exclude the tack thread. In a non-limiting example, the trap line 24 may be anchored at the anchor point 69 with a tack thread at any location around the outer perimeter 34 of the trap 30 and the reserve bridle 20 may be inserted within the loop 67 from any direction around the outer perimeter 34.

Figure 6:
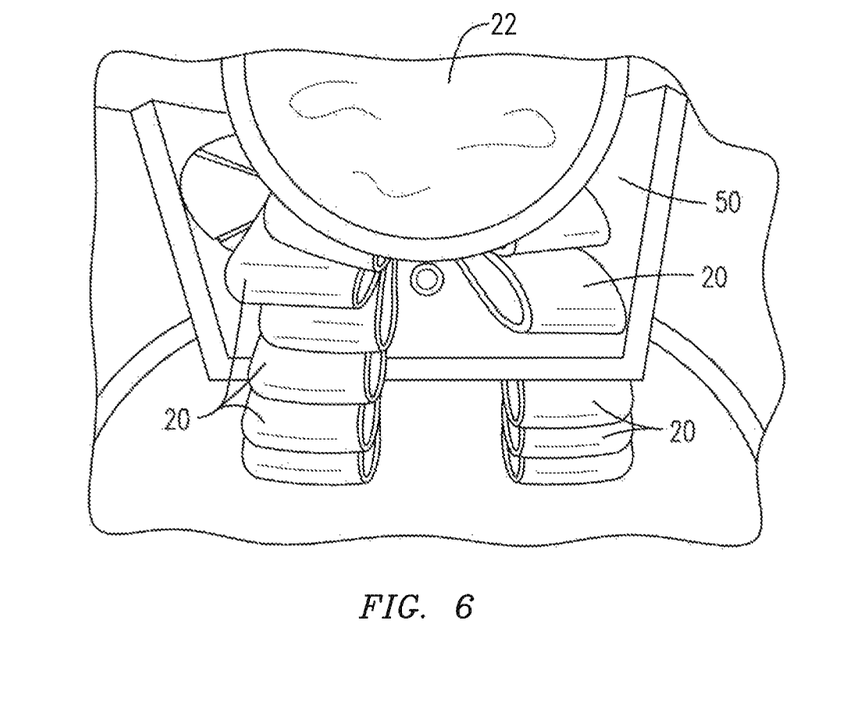
FIG. 6 is a perspective view of the reserve bridle of FIG. 4A folded under and over the kicker flap of FIG. 1A.

As illustrated in FIG. 6, after the first portion 73 (FIG. 4A) of the reserve bridle 20 is packed normally under the kicker flap 50, afterwards the intermediate location 74 of the reserve bridle 20 may then be folded over onto the kicker flap 50 and placed into the trap 30 and the remaining bridle 20 is folded normally. After folding the second portion 75 of the reserve bridle 20 on the kicker flap 50, the reserve pilot chute 22 may be positioned over the folded bridle 20, and the rest of the parachute container is packed, as appreciated by one skilled in the art and as per the manufacturer instructions.

Figure 7A:
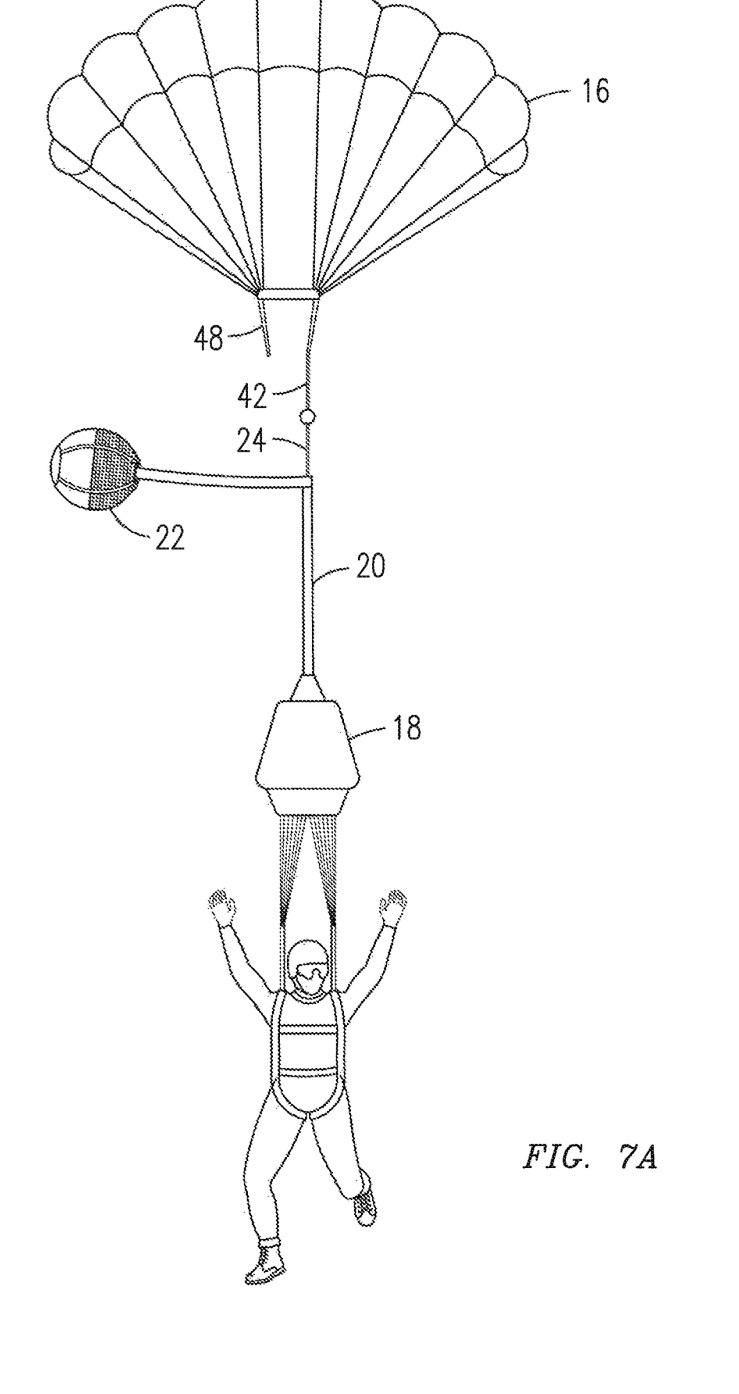
FIG. 7A is a plan view of the system of FIG. 5 being used to connect a cut-away main parachute with the reserve free bag of FIG. 4A to deploy the reserve parachute.
Figure 7B:
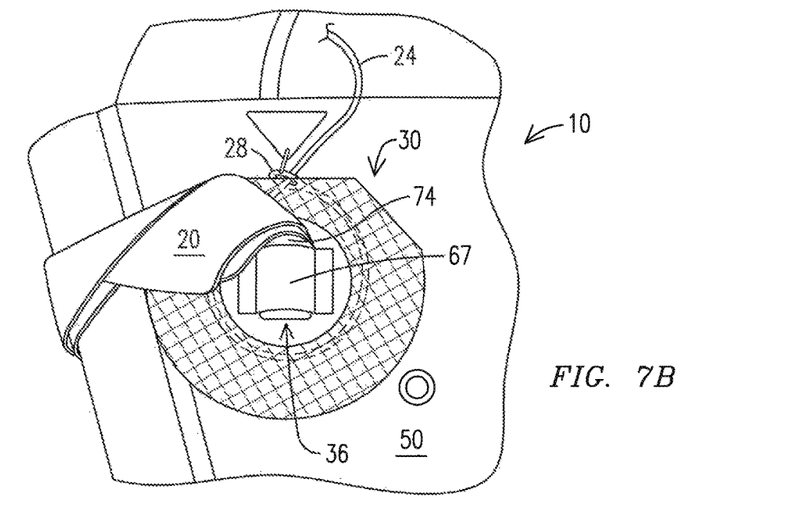
FIGS. 7B-7E is a plan view the system of FIG. 5 during the cut-away of the main parachute of FIG. 7A to connect the main parachute with the reserve free bag.
Figure 7C:
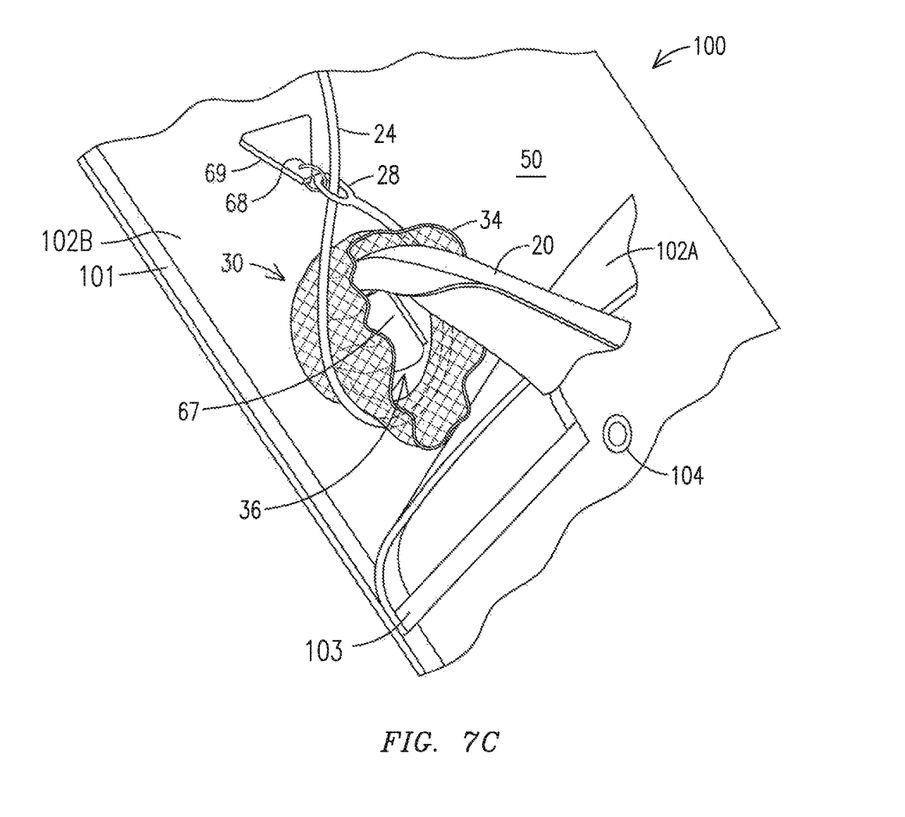
Figures 7D, 7E:
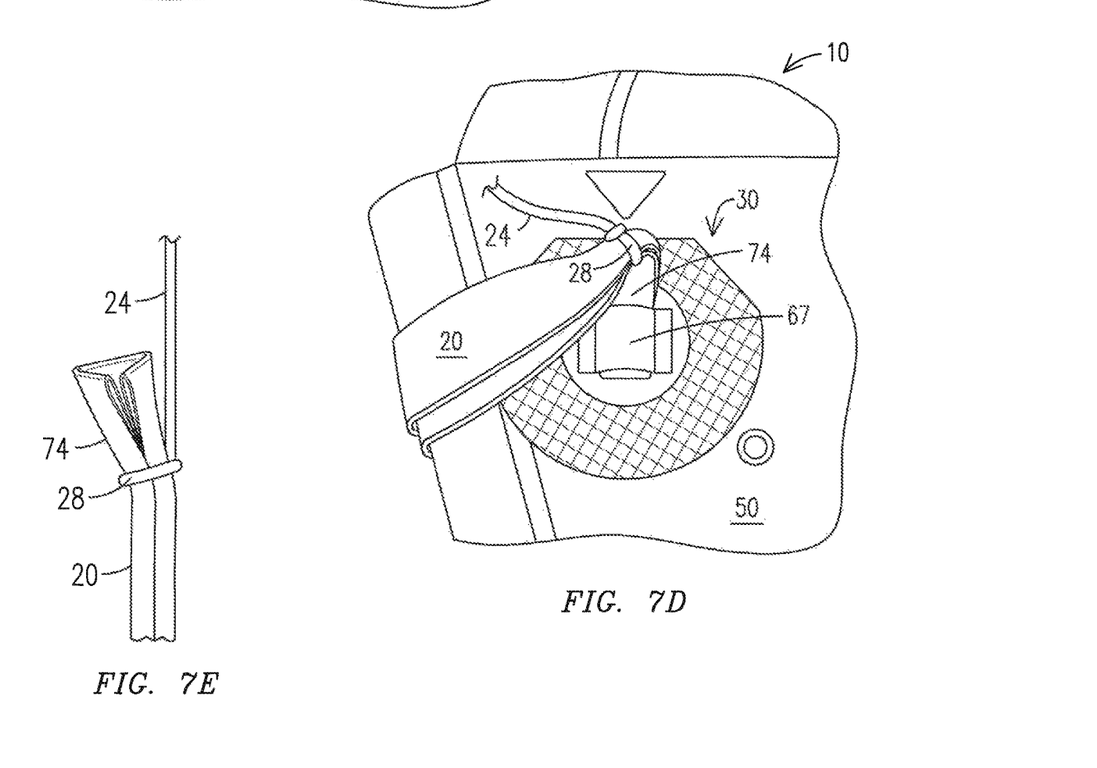

The system 10 may be utilized for deployment of the reserve parachute, based on various types of malfunctions of the main parachute. In one embodiment, as illustrated in FIG. 7A, the main parachute 16 deploys from the container 14, does not entangle with the jumper and yet still experiences a malfunction. In a non-limiting example, the malfunction may consist of one or more openings, tears, twists, broken lines in the main parachute 16. During such a malfunction, the jumper cuts-away the main parachute, and thus the main risers 48 begin to separate from the container 14. As previously discussed, the second end 45 of the RSL lanyard 42 may be connected to the main risers 48 and the first end 44 of the RSL lanyard 42 is connected to both the reserve ripcord 46 and the first end 26 of the trap line 24. Thus, after sufficient separation of the main risers 48 from the container 14, the RSL lanyard 42 pulls the reserve ripcord 46, which activates the reserve parachute deployment. Additionally, the RSL lanyard 42 may pull the trap line 24 taut, which causes the second end 28 of the trap line 24 to release from behind the edge of the trap 30 and tighten around the intermediate location 74 of the reserve bridle 20 (FIGS. 7B-7E). Since the trap line 24 is in tension between the intermediate location 74 of the bridle 20 and the main risers 48, the main parachute 16 will serve as the anchor to deploy the reserve parachute from the free bag 18. Additionally, since the second portion 75 of the bridle 20 between the reserve pilot chute 22 and the intermediate location 74 is not in tension when the trap line 24 is in tension, the reserve pilot chute does not serve as the anchor to deploy the reserve parachute from the free bag 18. Thus, when the main parachute 16 undergoes a malfunction, the trap 30 may be configured to cinch the trap line 24 around the reserve bridle 20 so that the main parachute 16 deploys the reserve parachute from the free bag 18.

Figure 8A:
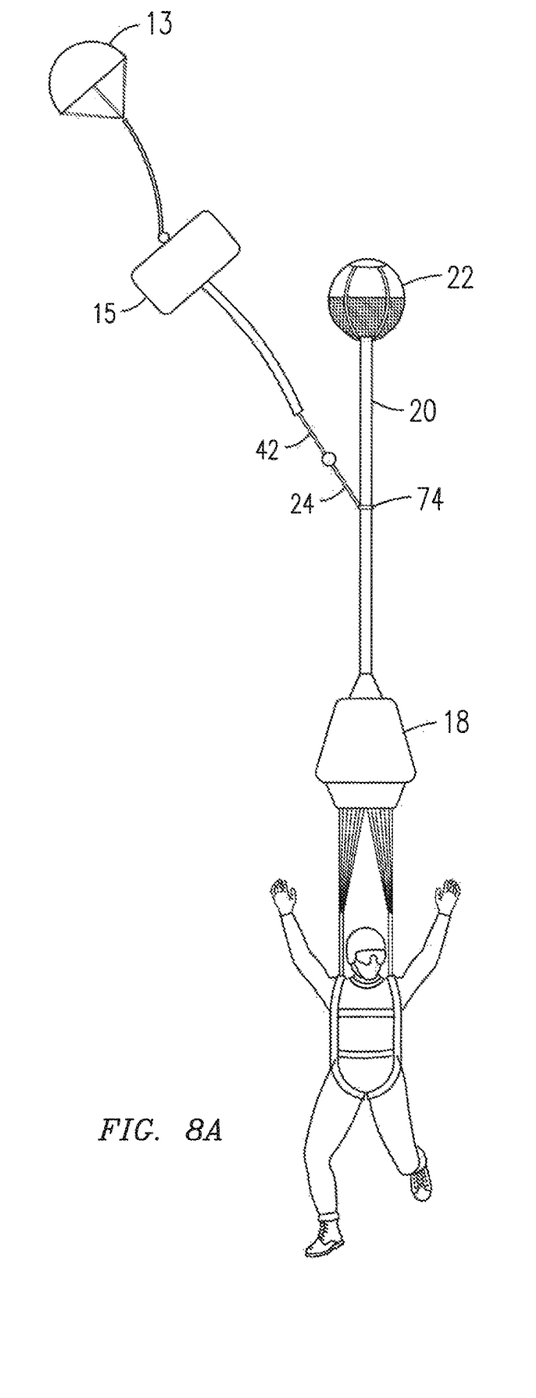
FIG. 8A is a plan view of the reserve pilot chute deploying the reserve parachute upon a low drag malfunction of the main parachute.
Figure 8B:
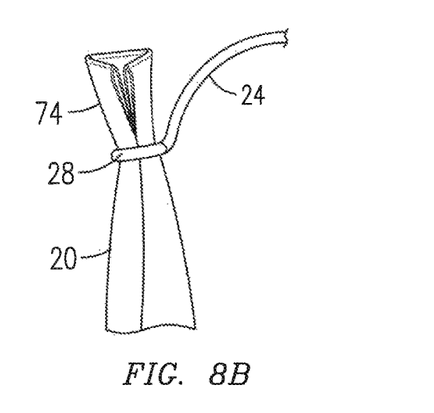
FIGS. 8B-8D is a plan view of the system of FIG. 5 of the trap releasing the reserve bridle in the event of the reserve pilot chute taking over the reserve deployment.
Figure 8C:
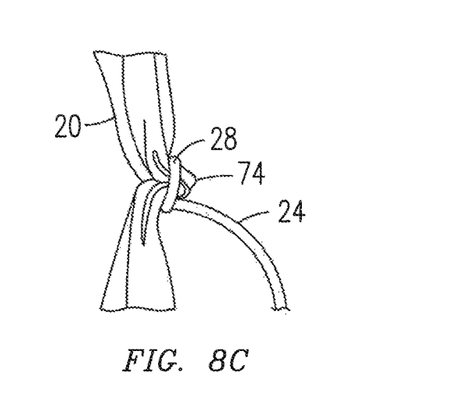
Figure 8D:
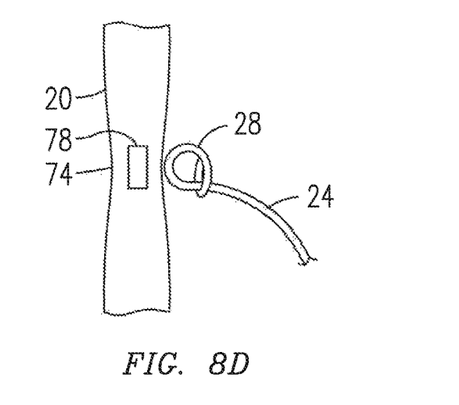

In another embodiment, as illustrated in FIG. 8A, the main parachute 16 may undergo a low drag malfunction, during which the main pilot chute 13 and the main bag 15 deploy but the main parachute does not deploy from the main bag 15. The deployed main pilot chute 13 and the main bag 15 may move a sufficient distance to cause the RSL lanyard 42 to pull the reserve ripcord 46 and pull the trap line 24 taut, thereby releasing the trap line 24 from behind the edge of the outer perimeter 34. Thus, the trap line 24 may be initially secured to the intermediate location 74 of the reserve bridle 20 (FIG. 8B). However, since the main parachute 16 has not deployed from the main bag 15, the main parachute 16 does not continue to move away from the jumper and thus the trap line 24 does not remain taut. Additionally, since the RSL lanyard 42 pulled the reserve ripcord 46, the reserve pilot chute 22 may deploy, creating tension in the second portion 75 of the bridle 20, thereby releasing the bridle 20 from the trap line 24 and permitting the reserve pilot chute 22 to deploy the reserve parachute from the free bag 18 (FIGS. 8C-8D).

Figure 9:
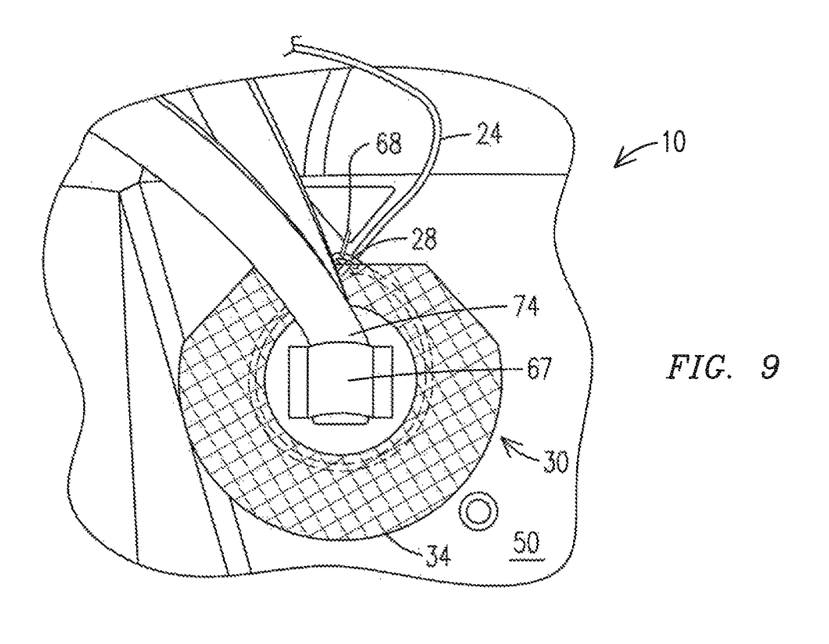
FIG. 9 is a plan view of the system of FIG. 5 after a failed deployment of the main parachute.

In another embodiment, as illustrated in FIG. 9, the main parachute 16 may fail to deploy from the parachute container, in which case the main parachute 16 is not used as an anchor to deploy the reserve parachute. Since the main parachute 16 may fail to deploy, the main risers 48 do not separate from the jumper and thus the trap line 24 does not become taut or release from behind the edge of the outer perimeter 34 of the trap 30. Thus, the trap 30 of the system 10 may be configured such that the trap line 24 remains held by the edge of the outer perimeter 34 if the main parachute fails to deploy. Thus, in the event of a failed deployment of the main parachute, the jumper may manually activate the reserve ripcord 46 to deploy the reserve parachute, which results in deployment of the reserve pilot chute 22 and tension of the reserve bridle 20 so that the intermediate location 74 is released from the loop 67 of the interior 36 of the trap 30, as illustrated in FIG. 9. After the reserve bridle 20 is released from the loop 67 of the interior 36, the trap 30 would resemble FIG. 3B, where the trap line 24 remains tacked to the anchor point 69 with the tack thread 68 and the trap line 24 remains held by the edge of the outer perimeter 34. Thus, the manual activation of the reserve parachute is not affected by the trap 30 of the system 10 and may result in the use of the reserve pilot chute 22 as an anchor to deploy the reserve parachute from the free bag 18.

Indeed, the trap 30 and the trap line 24 of the system 10, as described in the above disclosed embodiments may be effective as a means for coupling the main parachute 16 to the free bag 18 upon a malfunction of the main parachute 16. After a malfunction of the main parachute, a jumper will cutaway from the main parachute, then the trap 30 and trap line 24 may be used to connect the free bag 18 to the main parachute 16, by connecting the reserve bridle 20 (which is connected with the free bag 18) to the trap line 24 (which is connected with the RSL lanyard 42, which in-turn is connected to the main risers 48 and main parachute 16). Prior to the malfunction of the main parachute 16, the main parachute 16 and the free bag 18 may be initially decoupled, due to the reserve bridle 20 and the trap line 24 being decoupled and not connected. The above embodiments disclose the trap 30 and the trap line 24 as one non-limiting example of the means for coupling the main parachute 16 to the free bag 18 upon release of the malfunctioned main parachute 16, in which the main parachute 16 is decoupled from the free bag 18 prior to the malfunctioned deployment. However, the disclosed embodiments are not limited to the trap 30 and trap line 24 arrangement and include any structure or configuration which couples the main parachute 16 to the free bag 18 upon release of the malfunctioned main parachute 16 in which the main parachute is initially decoupled from the free bag 18 prior to the malfunction.

Figure 10A:
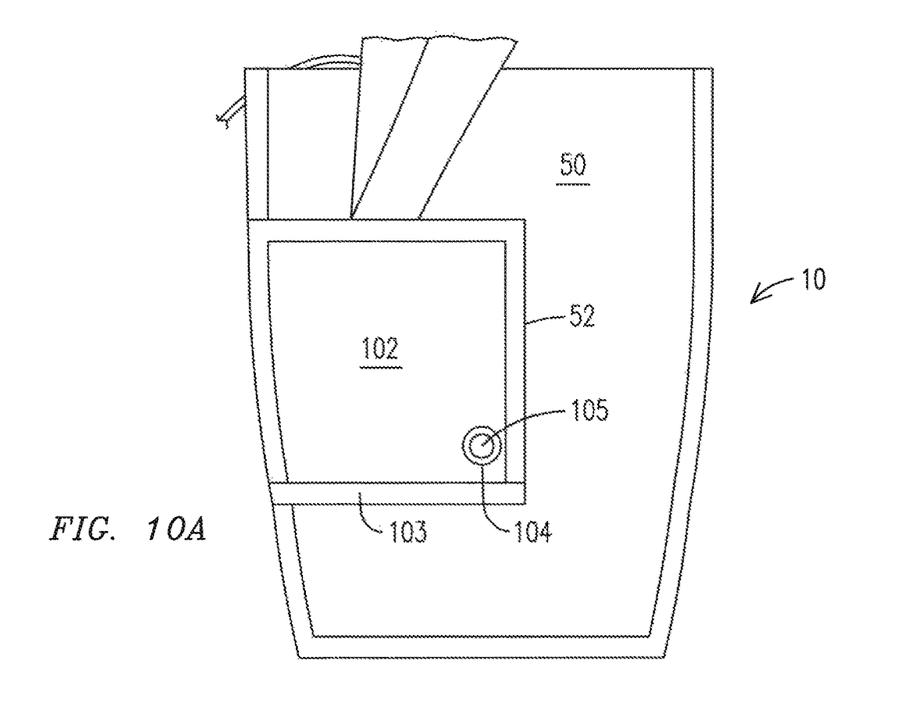
FIG. 10A is a plan view of the system of FIG. 9 with a flap provided to cover the trap system.

As illustrated in FIG. 10A, the system 10 may include a flap 102 that is secured to the mid portion 52 of the kicker flap 50 and covers the trap 30. The flap 102 is rotatably secured to the mid portion 52 of the kicker flap 50 along a hinge 103 and thus can rotate about the hinge 103. A grommet 104 may also be included, with an opening 105 through the flap 102 for the grommet 104, such that, upon packing the container 14, the closing loop is passed through the flaps of the container 14 including the kicker flap 50 and passed through the opening 105 of the grommet 104, after which the closing loop passes through the reserve pilot chute 22 and is secured with the reserve ripcord. However, the flap 102 need not include grommet 104.

Figure 10B:
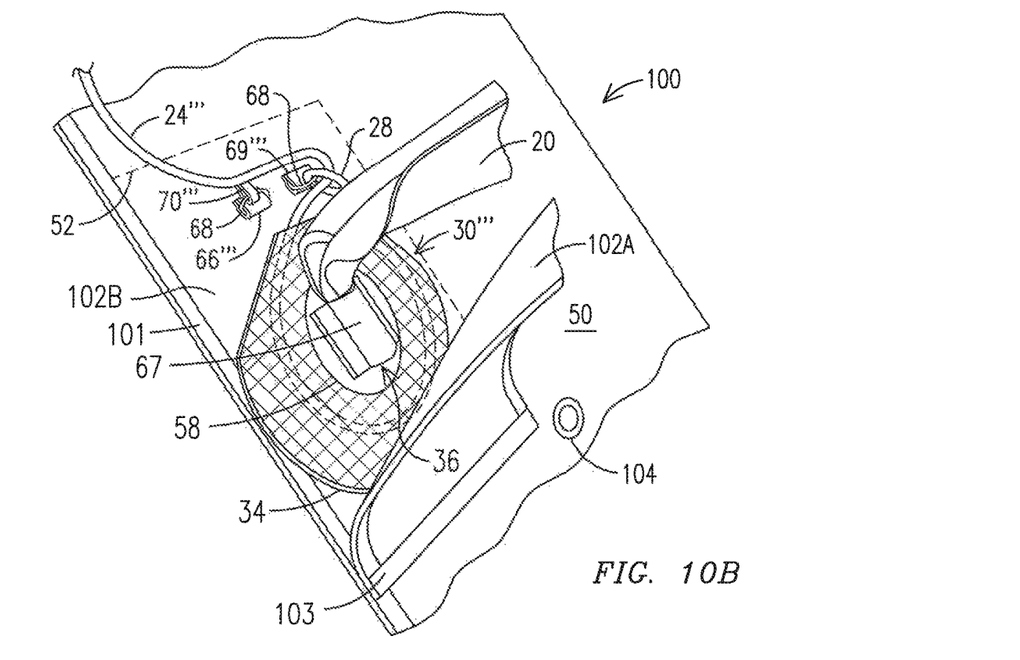
FIG. 10B is a perspective view of an installed kit for a parachute container to attach a trap system to the parachute container.
Figure 10C:
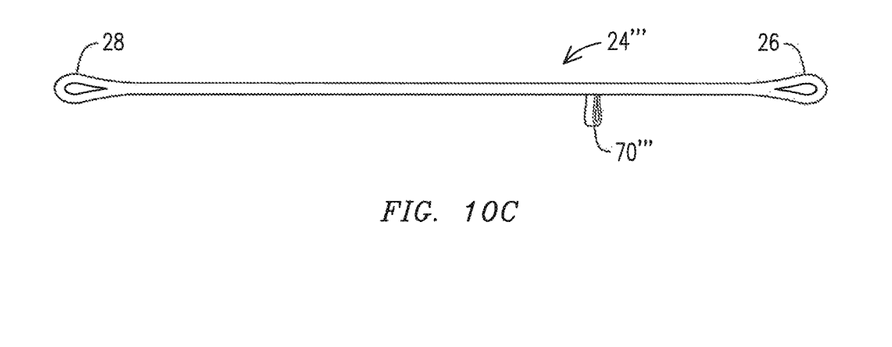
FIG. 10C is a plan view of a trap line of the trap system of FIG. 10B.

Although the above disclosed embodiments discuss the system 10 including the trap 30 and the trap line 24 installed on a parachute container 14, the disclosed embodiments need not include a parachute container 14 and may merely include a kit to convert a parachute container into an improved parachute container to deploy a reserve parachute upon a malfunction of a main parachute. FIG. 10B illustrates a kit 100 that is used to convert a parachute container into the parachute container 14 depicted in FIG. 1A, by providing a trap 30′″, a flap 102A and an attachment 102B that has a size approximately equal to the flap 102A. The trap 30′″ is positioned between the flap 102A and the attachment 102B, and the trap 30′″ is pre-secured to the attachment 102B. The kit 100 includes a means, including instructions (and materials) for securing the attachment 102B to the kicker flap 50 or any portion of the parachute container. For example, the kit 100 includes materials or instructions to stitch a perimeter 101 and a hinge 103 of the attachment 102B to the kicker flap 50, thereby securing the attachment 102B to the kicker flap 50. The kit 100 may merely provide instructions for securing the attachment 102B to the kicker flap 50 and need not include the materials for securing the attachment 102B to the kicker flap 50. Any stitching or sewing materials known to one skilled in the art may be utilized within the kit 100. As illustrated in FIG. 10B, the attachment 102B may be sized such that the grommet 104 is positioned outside the attachment 102B. However, the attachment 102B may be sized with an opening to encompass the grommet 104. In a non-limiting example, the attachment 102B may be secured to an area of the kicker flap 50. The kit 100 may include a list of installation instructions for securing the attachment 102B to the kicker flap (or other location) of the parachute container. The flap 102A can rotate about the hinge 103 segment of the attachment 102B. As illustrated in FIG. 10B, the flap 102A may be partially opened to reveal the trap 30′″ attached to the surface of the attachment 102B. The trap 30′″ of FIG. 10B operates in a similar manner as the trap 30 discussed above in the other embodiments, with the exception of the features discussed herein. As illustrated in FIG. 10B, the trap 30′″ includes a pair of cinch points or anchor points 66′″, 69′″. The trap line 24′″ (FIG. 10C) includes the first end 26 and the second end 28 of the trap line 24 discussed above, but further includes a loop 70′″ at a location between the first and second ends 26, 28. In a non-limiting example, the trap line 24′″ has a length in a range of 12-18″ and the loop 70′″ is positioned at a distance in a range of 3-5″ from the first end 26. In a non-limiting example, the loop 70′″ is positioned between a midpoint of the trap line 24′″ and the first end 26 of the trap line 24. As illustrated in FIG. 10B, a first tack thread 68 is passed through the loop 70′″ of the trap line 24′″, to tack the loop 70′″ to the first cinch point or anchor point 66′″ of the trap 30′″. As further illustrated in FIG. 10B, a second tack thread 68 is passed through the loop of the second end 28, to tack the loop of the second end 28 to the second cinch point or anchor point 69′″ of the trap 30′″. In a non-limiting example, the loop 70′″ provides a marking or indicator that the trap line 24′″ has not yet been pulled beyond the second cinch point 69′″, since the first tack thread 68 between the loop 70′″ and the first cinch point 66′″ will break before the second thread 68 between the loop of the second end 28 and the second cinch point 69′″ breaks. In a non-limiting example, the first cinch point 66′″ is positioned at a counterclockwise position relative to the second cinch point 69′″. In a non-limiting example, the first cinch point 66′″ is positioned between an 11 o'clock position and a 12 o'clock position, and the second cinch point 69′″ is positioned at an approximate 12 o'clock position along the outer perimeter 34. Although the trap 30′″ including the first and second cinch points 66′″, 69′″ is discussed above in the embodiment of the kit 100 to convert a parachute container into an improved parachute container, the trap 30′″ is not limited to this embodiment and may be utilized within any of the embodiments of the trap discussed above in FIGS. 1-9. Additionally, the embodiment of the kit 100 discussed above is not limited to the embodiment of the trap 30''' illustrated in FIG. 10B and may include any of the embodiments of the trap discussed above in FIGS. 1-9.

Although the above-discussed kit involves the attachment 102B that can be secured to the kicker flap 50 of the container, to convert the container to an improved container, the kit is not limited to including the attachment 102B and may merely include the trap 30''' and the trap line 24''', along with installation instructions for attaching the trap 30''' to any surface of the parachute container other than the kicker flap 50, instructions for connecting the trap line 24''' to the RSL lanyard and/or instructions for connecting the trap line 24''' to the trap 30'''. In a non-limiting example, the kit may include such instructions as the preferred location along the area of the kicker flap 50 to attach the trap 30''', instructions and materials to attach the inner perimeter 58 to the area of the kicker flap 50, and instructions and materials to attach the interior 36 with the loop 67 within the outer perimeter 34 along the area of the kicker flap 50. Additionally, the kit may be sold in various sizes, based on the size of the parachute container that is sought to be converted into an improved parachute container. In a non-limiting example, the diameter of the outer perimeter 34 of the trap 30''' may be larger, based on parachute containers of larger sizes.

Figure 11:
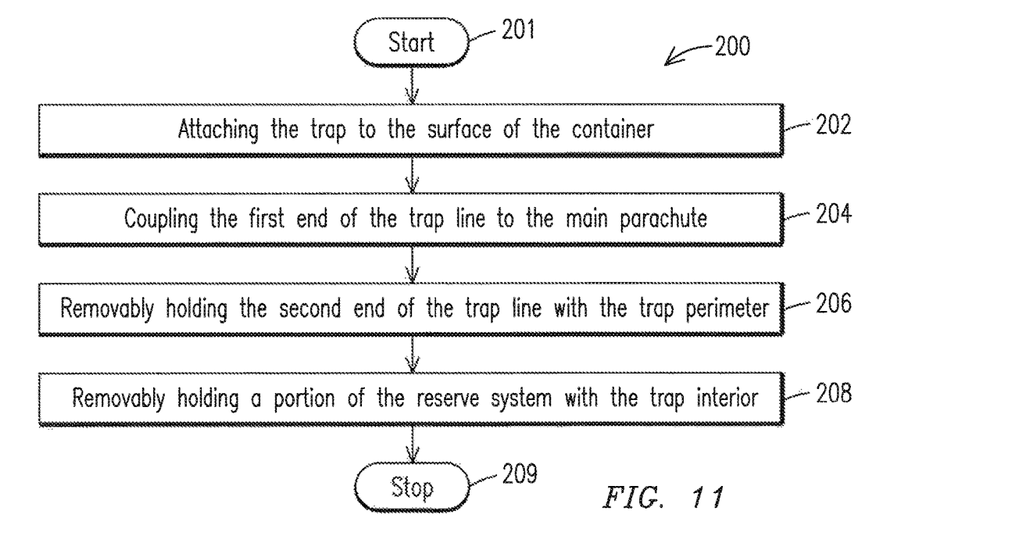
FIG. 11 is a flowchart depicting a method for installing a trap on a container.

FIG. 11 is a flowchart depicting a method 200 for installing the trap 30 to deploy a reserve parachute from the parachute container 14 upon a malfunction of the main parachute 16. The reserve parachute may be secured within the free bag 18 connected by the reserve bridle 20 to the reserve pilot chute 22. The method 200 may start at 201 by attaching 204 the trap 30 to the surface of the container 14. The method 200 then includes the step of coupling 202 the first end 26 of the trap line 24 to the main parachute 16 via risers 48 (through the RSL lanyard 42). The method 200 may further include removably holding 206 the second end 28 of the trap line 24 with the outer perimeter 34 of the trap 30. The method 200 may further include removably holding 208 a portion of the reserve system including at least a portion of the free bag 18, at least a portion of the reserve bridle 20 or at least a portion of the reserve pilot chute 22 with the interior 36 of the trap 30 within the outer perimeter 34, before ending at 209.

Upon a malfunction of the main parachute 16, the method may further include releasing the second end 28 of the trap line 24 from the outer perimeter 34 of the trap 30, and securing the second end 28 of the trap line 24 with the reserve bridle 20. The method may further include deploying the reserve parachute from the free bag 18 with the main parachute 16.

Upon a failed deployment of the main parachute 16, the method may include holding the second end 28 of the trap line 24 with the outer perimeter 34 of the trap 30, and releasing the reserve bridle 20 from the interior 36 of the trap 30. The method may further include deploying the reserve parachute from the free bag 18 with the reserve pilot chute 22.

While various embodiments have been shown and described herein, it will be obvious that such embodiments are provided by way of non-limiting example only. Numerous variations, changes and substitutions may be made without departing from the disclosed embodiments discussed herein. Accordingly, it is intended that the disclosed embodiments be limited only by the spirit and scope of the appended claims.

The invention claimed is:

1. A trap system for deployment of a reserve parachute from a container, said reserve parachute secured within a free bag connected by a reserve bridle to a reserve pilot chute, said trap system comprising:
   a trap line with a first end coupled to a main parachute; and a second end arranged in a loop that cinches when pulled; and
   a trap attached to a surface of the container, said trap comprising a perimeter to removably hold a second end of the trap line and an interior within the outer perimeter to removably hold a portion of at least one of the free bag, the reserve bridle and the reserve pilot chute;
   wherein the portion of at least one of the free bag, the reserve bridle and the reserve pilot chute is held detached from the second end of the trap line within the trap prior to the second end being cinched;
   wherein when the main parachute is disengaged during use, the trap line is pulled by the main parachute to cause the second end of the trap line to cinch around the portion of the at least one of free bag, the reserve bridle and the reserve pilot chute; and
   wherein when the main parachute fails to deploy the trap line does not cinch around the portion of the at least one of free bag, the reserve bridle and the reserve pilot chute.

2. The trap system of claim 1, wherein the first end of the trap line is coupled to a first end of an RSL (Reserve Static Line) lanyard, wherein the first end of the RSL lanyard is coupled to a reserve ripcord and a second end of the RSL lanyard is coupled to main risers of the main parachute.

3. The trap system of claim 2, wherein the trap is attached to a portion of a kicker flap of the container, wherein said portion of the kicker flap is adjacent to a portion of a flap where said first end of the RSL lanyard is removably connected to the reserve ripcord upon packing the container.

4. The trap system of claim 1, wherein the trap further includes an inner perimeter attached to the surface of the container and wherein an outer perimeter of the trap is detached from the surface of the container to form an edge sized to removably hold the second end of the trap line.

5. The trap system of claim 1, wherein the trap further includes an outer perimeter attached to the surface of the container and wherein the trap further includes an inner perimeter detached from the surface of the container, said inner perimeter forming an edge sized to removably hold the second end of the trap line.

6. The trap system of claim 4, wherein the inner perimeter and the outer perimeter form an arcuate shape, and wherein the second end of the trap line has a loop through which the trap line is passed, to removably hold the trap line under the edge of the outer perimeter.

7. The trap system of claim 6, wherein the outer perimeter defines an opening along the surface of the container, wherein said loop of the second end is positioned at a cinch point at the opening of the outer perimeter such that the trap line is configured to cinch the reserve bridle.

8. The trap system of claim 4, further comprising a tack thread attached to the surface of the container creating a cinch point, wherein the reserve bridle is inserted within the interior from a direction of the cinch point of the outer perimeter.

9. The trap system of claim 4, further comprising a tack thread attached to the surface of the container creating a cinch point, said tack thread directed through the loop end to anchor the loop of the second end such that the trap line is configured to cinch the reserve bridle at the cinch point.

10. The trap system of claim 4, further comprising a marking or second loop on the trap line passed through the loop and located outside the outer perimeter, said marking or second loop to visually indicate that the trap line has not been pulled above a cinch point.

11. The trap system of claim 1, wherein the interior comprises an elastic material attached along a portion of the surface of the container within the perimeter to define a loop sized to receive an intermediate location of the reserve system.

12. The trap system of claim 11, wherein the intermediate location includes a portion of webbing attached to the reserve bridle and wherein the reserve bridle is folded at the intermediate location along a length dimension and along a width dimension of the reserve bridle such that the intermediate location is removably held within the loop of the interior.

13. The trap system of claim 1, wherein when the main parachute is disengaged during use, said trap is configured to:
   initially release the second end of the trap line and secure the second end to the reserve bridle; and
   subsequently release the second end from the reserve bridle upon the reserve pilot chute deploying the reserve parachute from the free bag.

14. The trap system of claim 1, further comprising a rotatable flap attached to the surface of the parachute container along a hinge, said flap positioned to cover the trap upon packing the parachute container.

15. A kit for converting a parachute container into an improved parachute container configured to deploy a reserve parachute, said parachute container including a reserve parachute secured within a free bag connected by a reserve bridle to a reserve pilot chute, said parachute container further including an RSL lanyard with a first end attached to a reserve ripcord and a second end attached to a main riser of a main parachute, said kit comprising:
   an attachment configured to be secured to a surface of the parachute container, said attachment comprising;
   a trap line with a first end configured to be coupled to the first end of the RSL lanyard and a second end arranged in a loop that cinches when pulled,
   a trap secured to the attachment, said trap comprising an outer perimeter to removably hold a second end of the trap line and an interior within the outer perimeter configured to removably hold a portion of at least one of the free bag, the reserve bridle and the reserve pilot chute;
   wherein the portion of at least one of the free bag, the reserve bridle and the reserve pilot chute is held detached from the second end of the trap line within the trap prior to the second end being cinched;
   wherein when a main parachute is disengaged during use, the trap line is pulled by the main parachute to cause the second end of the trap line to cinch around the portion of the at least one of free bag, the reserve bridle and the reserve pilot chute; and
   wherein when the main parachute fails to deploy the trap line does not cinch around the portion of the at least one of free bag, the reserve bridle and the reserve pilot chute.

16. The kit of claim 15, further comprising a rotatable flap attached to the surface of the parachute container along a hinge, said flap positioned to cover the trap upon packing the parachute container.

* * * * *